US010165300B2

(12) United States Patent
He (10) Patent No.: US 10,165,300 B2
(45) Date of Patent: Dec. 25, 2018

(54) 3D TRANSFORM AND INTER PREDICTION FOR VIDEO CODING

(71) Applicant: BlackBerry Limited, Waterloo (CA)

(72) Inventor: Dake He, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 99 days.

(21) Appl. No.: 15/336,857

(22) Filed: Oct. 28, 2016

(65) Prior Publication Data

US 2018/0124419 A1    May 3, 2018

(51) Int. Cl.
| | |
|---|---|
| *H04N 19/10* | (2014.01) |
| *H04N 19/60* | (2014.01) |
| *H04N 19/513* | (2014.01) |
| *H04N 19/105* | (2014.01) |
| *H04N 19/126* | (2014.01) |
| *H04N 19/176* | (2014.01) |
| *H04N 19/177* | (2014.01) |
| *H04N 19/597* | (2014.01) |
| *H04N 19/64* | (2014.01) |
| *H04N 19/61* | (2014.01) |
| *H04N 19/109* | (2014.01) |

(Continued)

(52) U.S. Cl.
CPC ......... *H04N 19/513* (2014.11); *H04N 19/105* (2014.11); *H04N 19/109* (2014.11); *H04N 19/126* (2014.11); *H04N 19/167* (2014.11); *H04N 19/176* (2014.11); *H04N 19/177* (2014.11); *H04N 19/543* (2014.11); *H04N 19/597* (2014.11); *H04N 19/61* (2014.11); *H04N 19/62* (2014.11); *H04N 19/64* (2014.11)

(58) Field of Classification Search
CPC ..... H04N 19/105; H04N 19/109; H04N 19/61
USPC ...................................... 375/240.16
See application file for complete search history.

(56) References Cited

U.S. PATENT DOCUMENTS

| | | | |
|---|---|---|---|
| 4,691,329 A | * | 9/1987 | Juri ............. H04N 19/649 375/240 |
| 4,999,705 A | | 3/1991 | Puri |

(Continued)

FOREIGN PATENT DOCUMENTS

EP    1841235    10/2007

OTHER PUBLICATIONS

EPO, Extended European Search Report relating to EP application No. 17196710.2, dated Feb. 28, 2018.

(Continued)

*Primary Examiner* — Jeffery A Williams
(74) *Attorney, Agent, or Firm* — Rowand LLP (57) ABSTRACT

Methods and devices for video coding using inter prediction and three-dimensional transform. A sequence of pictures in the video is partitioned into coding cuboids. A predicted cuboid is generated for one of the coding cuboids using interprediction, including at least one motion vector and at least one reference picture index. The difference between the coding cuboid and the predicted cuboid results in a cuboid of residuals, which is then spectrally transformed using a three-dimensional transform to create a cuboid of transform domain coefficients, which are then entropy encoded. The decoding process generates the same predicted cuboid and reconstructs the cuboid of pixels using the predicted cuboid and a cuboid of reconstructed residuals.

24 Claims, 7 Drawing Sheets

(51) Int. Cl.
*H04N 19/62* (2014.01)
*H04N 19/167* (2014.01)
*H04N 19/543* (2014.01)

(56) References Cited

U.S. PATENT DOCUMENTS

| | | | |
|---|---|---|---|
| 2010/0189172 A1 | 7/2010 | Pateux et al. | |
| 2013/0083853 A1* | 4/2013 | Coban ................ | H04N 19/563 375/240.16 |
| 2013/0177084 A1* | 7/2013 | Wang ............... | H04N 19/00684 375/240.16 |
| 2015/0172694 A1* | 6/2015 | Shimizu ............... | H04N 19/597 375/240.16 |

OTHER PUBLICATIONS

Manoranjan et al.: "Joint texture and depth coding using cuboid data compression", 2015 18th International Conference on Computer and Information Technology (ICCIT), IEEE, Dec. 21, 2015, pp. 138-143, XP032909822.
Yu et al.: "Overview of AVS-video coding standards", Signal Processing, Image Communication, Elsevier Science Publishers, Amsterdam, NL, vol. 24, No. 4, Apr. 1, 2009, pp. 247-262, XP026091624.
M. Bhaskaranand and J. D. Gibson, "Distributions of 3D DCT coefficients for video," in Proc. ICASSP, 2009.

\* cited by examiner

3D TRANSFORM AND INTER PREDICTION FOR VIDEO CODING

FIELD

The present application generally relates to video coding and, in particular, methods and systems for video coding that use 3D transform and inter prediction.

BACKGROUND

Data compression is used in communications and computer networking to store, transmit, and reproduce information efficiently. It finds particular application in the encoding of images, audio and video. Common image compression formats include JPEG, TIFF, and PNG. A newly-developed video coding standard is the ITU-T H.265/HEVC standard. Other video coding formats include the VP8 and VP9 formats developed by Google Inc. Evolutions to all of these standards and formats are under active development.

All of these image and video coding standards and formats are based on predictive coding that create a prediction of data to be coded, then encode the error in the prediction (often called the residual) for transmission to a decoder as a bitstream. The decoder then makes the same prediction and adjusts it by the reconstructed error decoded from the bitstream. The data compression of the error at the encoder often includes a spectral transform of the error to create blocks of transform domain coefficients. This is typically accompanied by lossy quantization. The reverse operations are performed at the decoder to reconstruct the error/residual. Entropy coding (often context-adaptive) is typically used to encode the residual data, plus side information for making the predictions (e.g. intra-coding mode or inter-coding motion vectors), to generate a bitstream for transmission from encoder to decoder or for storage on a storage medium for later decoding. In some cases, the error at the encoder is encoded without using a spectral transform and/or quantization.

Recent developments in improving video coding performance have partly focused upon reducing the constraints on inter prediction, so that predictions may be may backwards, forwards, and may involve multiple reference pictures. This necessarily complicates the computational analysis in determining an optimal inter prediction at the encoder, and may necessitate an increase in the fast-access memory requirements at the decoder to perform the decoding process. As inter prediction has become increasingly more sophisticated and complex, it becomes increasingly clearer the returns in performance improvement are diminishing. Nevertheless, continued improvements in compression performance are sought by the video streaming and coding industries.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present application describes methods of encoding and decoding video, and encoders and decoders for encoding and decoding video.

In a first aspect, the present application describes a method of encoding a video in a video encoder to produce a bitstream, the video including a sequence of pictures in a coding order, the sequence of pictures being partitioned into a plurality of rectangular coding cuboids, at least one rectangular coding cuboid including portions of two or more consecutive pictures in the coding order. The method includes selecting inter-prediction information for the at least one rectangular coding cuboid, including at least one motion vector and at least one reference picture index; generating a predicted cuboid for said at least one rectangular coding cuboid based on the at least one motion vector and the at least one reference picture index; determining a cuboid of residuals by subtracting the predicted cuboid from said at least one rectangular coding cuboid; three-dimensional spectral transforming and quantizing the cuboid of residuals to generate a cuboid of transform domain coefficients; and entropy encoding the cuboid of transform domain coefficients and the inter-prediction information.

In another aspect, the present application describes a method of decoding a video from a bitstream, the video including a sequence of pictures in a coding order. The method includes decoding a partition mode from the bitstream, the partition mode defining the partitioning of a portion of the sequence of pictures into a plurality of rectangular coding cuboids, at least one rectangular coding cuboid including portions of two or more consecutive pictures in the coding order; decoding, from the bitstream, inter-prediction information associated with the at least one rectangular coding cuboid, including at least one motion vector and at least one reference picture index; generating a predicted cuboid for said at least one rectangular coding cuboid based on the at least one motion vector and the at least one reference picture index; reconstructing a cuboid of transform domain coefficients from the bitstream; dequantizing and three-dimensional inverse transforming the cuboid of transform domain coefficients to produce a reconstructed residual cuboid; and reconstructing the pixels of said at least one rectangular coding cuboid as the sum of the predicted cuboid and the reconstructed residual cuboid.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264/AVC standard for video coding, the H.265/HEVC standard, the VP8 format, the VP9 format, or others. Those ordinarily skilled in the art will understand that the present application is not limited to those video coding standards and formats but may be applicable to other video coding/decoding standards and formats, including possible future standards, multi-view coding standards, scalable video coding standards, 3D video coding standards, and reconfigurable video coding standards. Similarly, to the extent that reference is made to particular image coding standards and formats, it will be appreciated that the processes and devices described may be implemented in connection with other standards, including future standards In the description that follows, when referring to video the terms frame, picture, slice, tile, quantization group, and rectangular slice group may be used somewhat interchangeably. Those of skill in the art will appreciate that a picture or frame may contain one or more slices or segments. A series of frames/pictures may be called a "sequence" in some cases. Other terms may be used in other video or image coding standards. It will also be appreciated that certain encoding/decoding operations might be performed on a frame-by-frame basis, some are performed on a slice-by-slice basis, some picture-by-picture, some tile-by-tile, and some by rectangular slice group, etc., depending on the particular requirements or terminology of the applicable image or video coding standard. In any particular embodiment, the applicable image or video coding standard may determine whether certain operations described below are performed in connection with frames and/or slices and/or pictures and/or tiles and/or rectangular slice groups, etc., as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, quantization groups, etc., as will become apparent in light of the description below.

As will become apparent from the description herein, coding operations that are performed with respect to coding units, frames, transform units, slices, etc., in conventional 2D video coding may be extended herein to be applied to three-dimensional units extending to parts of two or more adjacent pictures in coding order. The present application may use the term "coding cuboid" to refer to a three-dimensional block or rectangular cuboid of data spanning two or more consecutive pictures in coding order. In some contexts the term "coding cuboid" may be used herein to refer to a largest coding cuboid, a prediction cuboid, a transform cuboid, or other such cuboids.

In the description below, the term "coding mode" may be used to refer to a set of coding decisions and/or parameters for coding a block or cuboid. The coding mode may, in many examples herein, include inter-coding parameters such as the motion vector(s) and reference picture indices. It may in some cases also include quantization parameters. In some cases, the term coding mode includes partitioning information (i.e. a partition mode) for dividing a cuboid into a set of smaller cuboids. In some cases, the partitioning is partitioning of a largest coding cuboid into rectangular cuboids, which are then predicted using the selected prediction operation. In some cases, the partitioning alternatively, or additionally, refers to partitioning of the rectangular cuboids (and in particular, the residual cuboids) into smaller transform units (cuboids) for the purposes of transform and quantization.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern image and video coding processes almost all rely upon predictive coding to compress the image data. Block-based predictive coding involves partitioning a picture into a plurality of 2D blocks (often square or rectangular, and possibly of varying sizes) and encoding the data block-by-block. To compress the data, rather than encoding the raw pixel data, a prediction of the block is generated and the difference (termed the error or residual) between the original block and the predicted block is encoded. Encoding typically involves the 2D spectral transform of the residual data, the quantization of the transform coefficients, and the entropy encoding of the quantized transform coefficients in accordance with whatever entropy coding scheme, possibly including binarization, is being used for a given case.

The creation of a predicted block is often either created through inter prediction (e.g. relying upon pixel data in a previously-reconstructed picture in a sequence of pictures) or intra prediction (e.g. relying upon nearby previously-reconstructed pixel data in the same picture as the current block). As such, inter prediction aims at exploiting temporal redundancy between pictures, and intra prediction aims at exploiting spatial redundancy within a picture.

Recent analysis has found that although inter prediction aims at exploiting the temporal redundancy between pictures in a series of pictures in a video, temporal redundancy persists in the residual pictures after use of inter prediction. Due to the nature of video capturing and the presence of quantization, motion-based (inter) prediction is rarely perfect. For example, lighting conditions might change from one picture to another picture and as a result of motion-based prediction the residual pictures are likely to retain some DC components. Since the residual DC components are directly related to lighting conditions, there exists some temporal redundancy among these DC components if the changes in lighting conditions are not random. In a typical video capturing process, lighting conditions rarely change randomly. Furthermore, even if lighting conditions are ideal and remain constant, as a result of quantization, the prediction likely will retain quantization artifacts, which may propagate from one picture to another picture even if the motion is perfectly assessed. Note that quantization artifacts are not present in the source pictures; they become part of the residual pictures after prediction. Since these artifacts are likely to be similar in subsequent pictures if the same or similar quantization parameters are used to maintain visual quality, temporal redundancy may persist among these residual pictures after motion compensated prediction.

In one aspect, the present application proposes to apply encoding and decoding operations to 3D rectangular cuboids of pixel data spanning two or more consecutive pictures. That is, one or more prediction operations may be made to build a 3D predicted cuboid, which, when subtracted from a 3D source data cuboid, results in a 3D residual cuboid. The 3D residual cuboid is then spectrally transformed using a 3D transform operation to generate a 3D cuboid of transform domain coefficients. The 3D transform may exploit the temporal redundancy that persists in a residual cuboid, even in the case where the 3D residual cuboid was arrived at using motion prediction.

In conventional 2D video coding, an original block of pixels may be denoted by x and its prediction denoted by p. The prediction p is generated from previously reconstructed image data using either intra or inter prediction. Since p is available to both the encoder and the decoder, one can subtract p from x to obtain the residual as follows:

$$e = x - p$$

The residual e is spectrally transformed, quantized and entropy encoded to create a bitstream of encoded video data.

Suppose now that x is a 3D rectangular cuboid with dimensions $N_x$, $N_y$, and $N_t$, where $N_x$, $N_y$, and $N_t$ are all positive integers. As a convention, $N_x$ and $N_y$ indicate the number of columns and the number of rows as in a 2D image block, and $N_t$ indicates the number of $N_x \times N_y$ image blocks in x, i.e., the dimension along the time axis. The term "time" axis refers to time in the sense of the coding order for the pictures which may or may not correspond to the display order or sequence for the pictures. One way to construct and visualize x is to stack collocated blocks of size $N_x \times N_y$ in $N_t$ consecutive pictures in a video sequence.

For brevity, the described examples herein are for the luma component of a video sequence or one of the red, green, and blue components if the video sequence uses the RGB format. In some embodiments, examples of the present application may be applied to chroma components or to luma and chroma components together. In some cases, extensions to colour components may involve adding a 4$^{th}$ dimension $N_c$, where $N_c$ indicates the total number of components that a picture in the video sequence has, e.g. $N_c = 3$ for the common YUV format or $N_c = 4$ for the YUV format plus an alpha channel.

When x is a 3D rectangular cuboid with dimensions $N_x$, $N_y$, and $N_t$, both p and e are rectangular cuboids with the same dimensions. Though the formula e=x−p looks similar to that in the 2D case, one of the challenges present in the 3D case but not in the 2D case is that the inter prediction process used to generate p may be subject to additional constraints. That is, the prediction process cannot rely upon any reconstructed pixels in the volume defined by x when generating p.

Lamest Coding Cuboid

In some example embodiments, a series of consecutive pictures in coding order is partitioned into cuboids, which may be referred to herein as largest coding cuboids (LCC). In some embodiments, each LCC may be coded independently of other LCCs in that each LCC may have its own coding parameters selected so as to optimize coding of the LCC, which means the partitioning of the LCC, the prediction operations used, the quantization parameters, etc. may be optimized for rate-distortion performance on an LCC-basis.

In some examples, an LCC can have 64×64×8, 64×64×16, 64×64×32, 64×64×64, 64×64×128, 128×128×128, or any preferred dimensions, where the first two numbers indicate the dimensions in a picture, and the third number indicate the number of pictures. For example, a 64×64×8 LCC consists of co-located 64×64 blocks from 8 consecutive pictures.

The partitioning of the series of consecutive pictures into LCCs may proceed from left to right, top to bottom, and following the coding order of the pictures. Note that since LCCs form a partition of the video sequence, i.e., every pixel in the video sequence is included in one and only one LCC, they are non-overlapping. For a video sequence whose dimensions are not multiples of the specified LCC dimensions, the video sequence may be extended to fill the LCCs at the boundary by using a method known both to the encoder and the decoder. Examples of such a method include: extend the boundary by using a default fill-in value (e.g. 128 for video sequences with bit-depth of 80, etc.), mirror at the boundary, copy the boundary pixels, etc.

In an example in which 64×64×8 LCCs are used in coding a video sequence, the 8 consecutive pictures are dealt with as a group and LCCs may be processed in a raster scan order (from left to right and from top to bottom) in some embodiments. In other words, the processing (encoding or decoding) a subsequent LCC in the group of pictures following the scan order will not start until the current LCC, a full 64×64×8 cuboid, is completed. In some other embodiments, an order other than raster scan order is used when ordering the processing of LCCs.

The definition of an LCC above is general in that an LCC might include image blocks from both I pictures and P pictures. However, in some embodiments, constraints may be imposed, for example that all image blocks in an LCC are from I pictures, or only the first image block in an LCC is from an I picture and the remaining image blocks in the same LCC are from P pictures, etc.

Partitioning of LCCs

Let $N_x \times N_y \times N_t$ denote the dimensions of LCCs used to encode and decode a current video sequence. Let i denote the index of the current picture. Accordingly, $N_t$ pictures with indices i, i+1, . . . i+$N_t$−1 are coded as a group. Note that for brevity, the present description presumes that the coding order is the same as the display order. In the cases where a different coding order is preferred, the above indices are in the coding coder.

Figure 1:
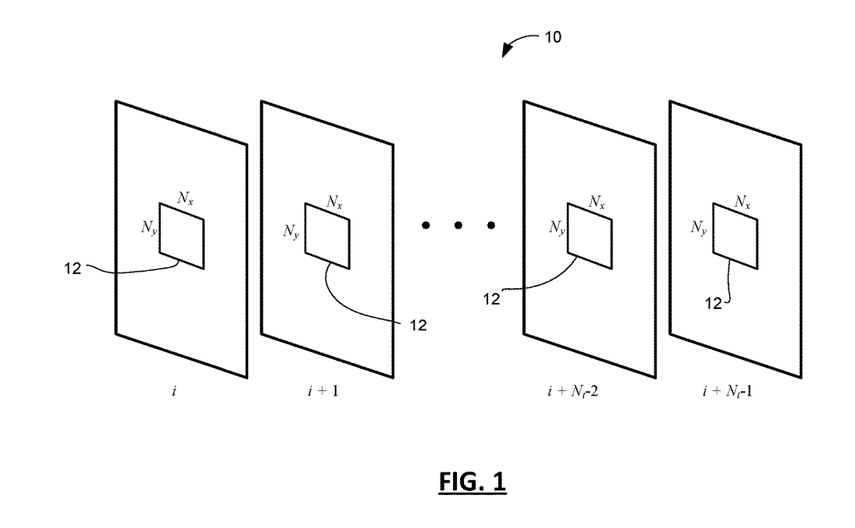
FIG. 1 illustrates an example series of pictures from a video and a coding cuboid.

Reference is made to FIG. 1, which shows a sequence of pictures 10 in a coding order, including pictures i, i+1, . . . i+$N_t$−2, i+$N_t$−1. An LCC 12 of size $N_x \times N_y \times N_t$ is shown. The LCC in this example includes $N_x \times N_y$ portions of the $N_t$ pictures from i to i+$N_t$−1.

Location in a picture uses a 2D coordinate system where the origin is at the top-left corner of the picture. The coordinate pair (j, k) denotes the position of a current LCC (specifically the top-left corner of the LCC) in picture i, where j is the coordinate along the x-axis (horizontal), and k is the coordinate along the y-axis (vertical). Since LCCs are typically constructed by using co-located image blocks, it is clear that the current LCC consists of $N_t$ image blocks from the $N_t$ pictures, respectively, and all the image blocks are at the same position (j, k) within each picture. Accordingly, the current LCC may be uniquely identified with coordinates (j, k, i), and thus may simply refer to the current LCC as the LCC at (j, k, i).

The coding mode for the current LCC may include the following parameters:

1. The partition of the LCC into prediction units for prediction generation.
2. The prediction model and the prediction model parameters (motion vectors, reference picture indices) used for each prediction unit for prediction generation.
3. The partition of the LCC into transform cuboids for application of a 3D transform to obtain a cuboid of residuals for coding.

The prediction operation used in connection with the current LCC to generate a prediction unit may use intra prediction or inter prediction. Let x denote a rectangular cuboid in the current LCC. Note that x may not be the same size as the LCC, and may be referred to generally as a coding cuboid. In other words, an LCC may be partitioned into a multitude of units, and these units may be predicted sequentially following a prescribed order (e.g. a raster scan order from left to right, top to bottom, and the lowest picture order to the highest picture order, diagonally and from lowest picture order to highest picture order, zig zag and from lowest picture order to highest picture order, or in any other prescribed coding order). Each of these units may be referred to as a prediction unit or prediction cuboid.

Let $x_l$ denote the image block that is the intersection between picture $l$ and x, $l=i_x, i_x+1, \ldots, i_x+N_{x,t}-1$, where $i_x$ denotes the first picture that intersects with x, and $N_{x,t} \leq N_t$ denotes the number of pictures intersecting with x (or equivalently the dimension of x along the time axis). In one example, intra prediction may be applied to generate the prediction for each $x_l$. Note that since intra prediction uses only reconstructed pixels from the current picture, the intra prediction process may be similar to conventional 2D intra prediction in some implementations. The description below will focus on inter prediction for 3D cuboids.

In some implementations, inter prediction may be subject to the following operational constraints:

C1. Fully reconstructed pictures at indices i'<i are available as reference pictures to generate prediction for $x_l$, $i \leq l \leq i+N_{x,t}-1$.

C2. The reconstructed portion of a picture at index $i \leq i' < l$ may be used to generate prediction for $x_l$. In the case where x is a subset of the current LCC, the reconstructed portion of the current LCC in a picture at index $i \leq i' < l$ may also be used to generate prediction for $x_l$.

Constraint C1 states that fully reconstructed pictures that are earlier in the coding order than any portion of the LCC are available as reference pictures to generate a prediction. Constraint C2 states that if the reference picture is one of the pictures that intersects the LCC, then only the reconstructed portion of that picture may be used. That is, portions of pictures in reconstructed LCCs that are earlier in the scan order than the current LCC may be used. Indeed, even reconstructed portions of the current LCC may be used. These constraints may be applied within the motion vector search operation to ensure that any motion vectors for building a current prediction unit only point to valid portions of the sequence of pictures. Moreover, the constraints may impact the motion vector coding process since the decoder may presume that the motion vector being specified in the bitstream points to a valid portion of the sequence of pictures. In other words, the constraints may limit the valid range of a motion vector to be coded.

Figure 2:
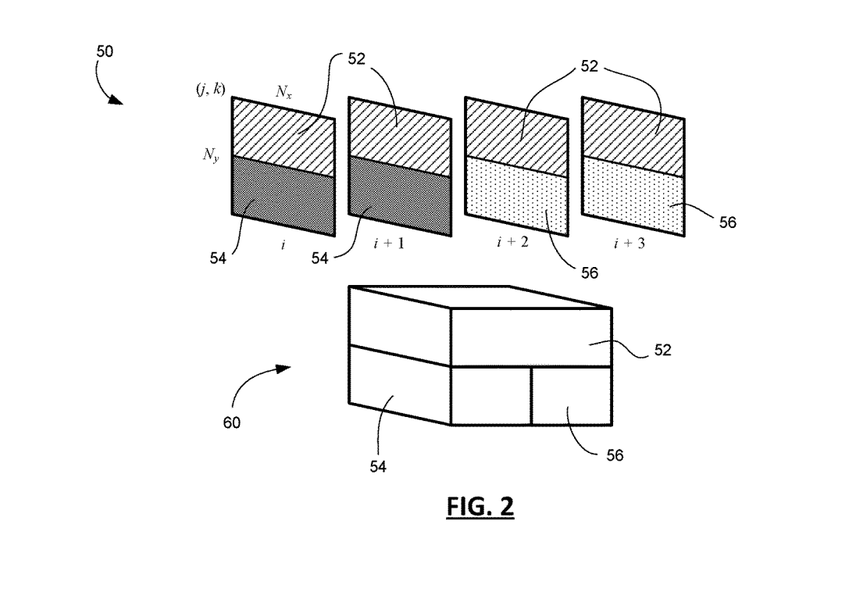
FIG. 2 shows one example of partitioning an example coding cuboid.

Reference is now made to FIG. 2, which diagrammatically shows an example of a partitioned LCC 50. The LCC 50 includes $N_x \times N_y$ portions of four pictures denoted i, i+1, i+2, i+3. The upper-left corner of each portion is at coordinate (j, k) in its respective picture. The 3D LCC 50 is illustrated conceptually as a 3D block 60. The partitioning of the LCC 50 in this example divides the LCC into three coding cuboids. A first coding cuboid 52 is of size $$N_x \times \frac{N_y}{2} \times 4,$$

and is located at (j, k, i). A second coding cuboid 54 is of size $$N_x \times \frac{N_y}{2} \times 2,$$

and is located at $$\left(j, k+\frac{N_y}{2}, i\right).$$

A third coding cuboid 56 is of size $$N_x \times \frac{N_y}{2} \times 2$$

and is located at $$\left(j, k+\frac{N_y}{2}, i+2\right).$$

Figure 3:
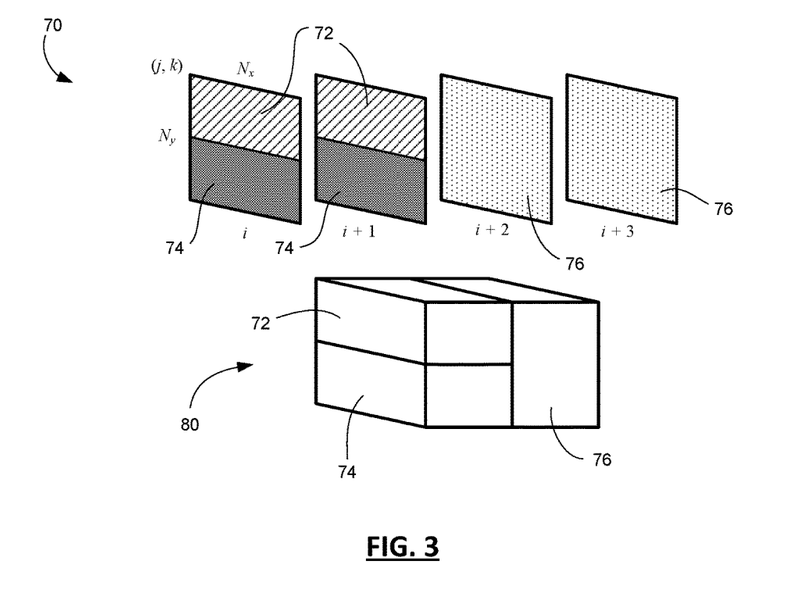
FIG. 3 shows another example of partitioning the example coding cuboid.

Another example of a partitioned LCC 70 is shown in FIG. 3. The LCC 70 again includes $N_x \times N_y$ portions of four pictures denoted i, i+1, i+2, i+3, and the upper-left corner of each portion is at coordinate (j, k) in its respective picture. The LCC 70 is illustrated conceptually as a 3D block 80. In this example the LCC 70 is partitioned into three coding cuboids in a different manner than the cuboids of FIG. 2. In this example, a first coding cuboid 72 is of size $$N_x \times \frac{N_y}{2} \times 2,$$

and is located at (j, k, i). A second coding cuboid 74 is of size $$N_x \times \frac{N_y}{2} \times 2,$$

and is located at $$\left(j, k+\frac{N_y}{2}, i\right).$$

A third coding cuboid 76 is of size $N_x \times N_y \times 2$ and is located at (j, k, i+2). Other partitions may be used in other examples.

Motion Compensation

Inter prediction is the building of a predicted block or cuboid based on reconstructed pixels from one or more reference pictures. Assume that x is a rectangular cuboid at $(j_x, k_x, i_x)$ and with dimensions $N_{x,x} \times N_{x,y} \times N_{x,t}$, where $1 \leq N_{x,x} \leq N_x$, $1 \leq N_{x,y} \leq N_y$, and $1 \leq N_{x,t} \leq N_t$. Throughout this section, let p denote the prediction of x, and $p_l$ denote the prediction of $x_l$, $l=i_x, i_x+1, \ldots, i_x+N_{x,t}-1$. The constraints noted above may applied to the process for generating the prediction p. At least three example process for generating a 3D prediction p are described below.

In a first example process, the prediction p is generated through creating individual predictions $p_l$ of each image block $x_l$ in the cuboid x. This may be termed the "2D Translation Model". In this model, each $p_l$ is a copy, i.e. a motion-vector-based translation, of an image block in a reference picture. Each $p_l$ is generated by using its own motion vectors and reference picture indices. Consider now an example case where each $p_l$ is generated by using exactly one reference picture index and exactly one motion vector. Since different $p_l$ may share a same reference picture, in the 2D Translation Model there are at most $N_{x,t}$ reference pictures for x in this example case. Specifically, let $mv_l=(mv_{l,x}, mv_{l,y})$ denote the motion vector and let $f_l$ denote the index of the reference picture used to generate $p_l$. Then for each $l \in \{i_x, i_x+1, \ldots, i_x+N_{x,t}-1\}$ we have $p_l$ as a copy, i.e the translation, of the image block at $(j_x+mv_{l,x}, k_x+mv_{l,y})$ in the reference picture indexed by $f_l$.

In a second example process, termed the "3D Translation Model", the predicted cuboid p is a copy, i.e. the translation, of a cuboid in the reference pictures. A single motion vector is used to generate prediction p in this case. Specifically, let $mv_x=(mv_{x,x}, mv_{x,y})$ denote the motion vector used to generate p, and let $f_x$ denote the index of the reference picture used to generate $p_l$, where $l=i_x, i_x+1, \ldots, i_x+N_{x,t}-1$. Then we have $f_l=f_{i_x}+l-i_x$, that is, any $f_l$ can be derived by shifting a single index $f_{i_x}$. In other words, $mv_x$ points to a cuboid of the same size as x at $(j_x+mv_{x,x}, k_x+mv_{x,y}, f_{i_x})$. In comparison to the 2D Translation Model where $N_{x,t}$ motion vectors need to be coded, a single motion vector $mv_x$ and a single reference picture index $f_{i_x}$ need to be coded in the 3D Translation Model. Consequently, the cost of coding motion vectors and reference picture indices in the 3D Translation Model is typically lower than that in the 2D Translation Model. Note that in some example cases, one might use the 3D translation model more than one times to generate the prediction p. For example, one might use the 3D translation model for the first time to generate a prediction cuboid $p^{(0)}$ and use the model again for the second time to generate a prediction cuboid $p^{(1)}$. The prediction cuboid p for x is then a combination, possibly a linear combination, of $p^{(0)}$ and $p^{(1)}$. Note that each time the 3D translation model is used, the corresponding motion vector and the corresponding reference picture index need to be coded. In the above example, two sets of motion vectors and reference picture indices are coded, one set for $p^{(0)}$ and the other set for $p^{(1)}$.

Figure 4:
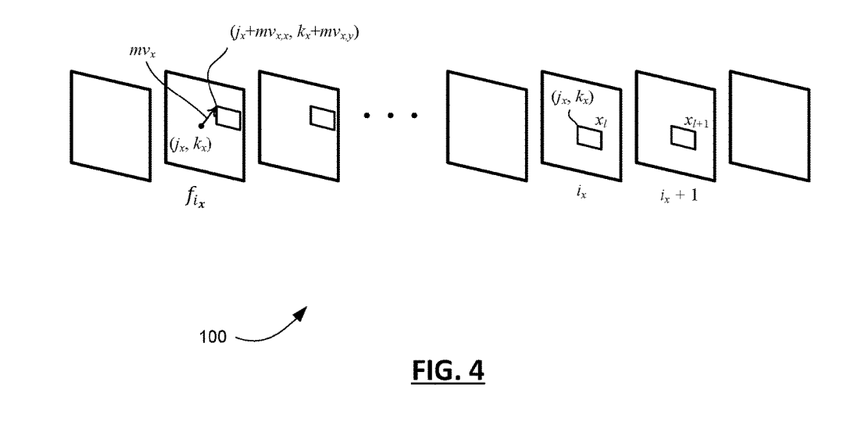
FIG. 4 shows an example of 3D translation inter-prediction for an example coding cuboid.

FIG. 4 diagrammatically illustrates a sequence 100 of pictures in a video that show one example embodiment of 3D Translation, in which a prediction p is found at $(j_x+mv_{x,x}, k_x+mv_{x,y}, f_{i_x})$ and forms the prediction for coding cuboid x. In this simplified example, the coding cuboid x spans only two pictures. In this example, the reference picture index $f_{i_x}$ indicates the reference picture corresponding to picture $i_x$. It will be noted that the translation defined by motion vector $mv_x$ specifies a translation from coordinates $(j_x, k_x)$ to coordinates $(j_x+mv_{x,x}, k_x+mv_{x,y})$. That location then defines the upper left front corner of the prediction p, i.e. the predicted cuboid. The pixel data from the predicted cuboid serves as the prediction for the coding cuboid x.

In a third example process, termed the "2D to 3D Mapping Model", rather than determining the predicted cuboid p by translating an equivalently-sized cuboid from a set of reference pictures, a single reference picture is used as the source pixel data for building the predicted cuboid p. In particular, each slice $p_l$ of the predicted cuboid is a copy of an image block from the single reference picture. The motion vector $mv_x$ points to the initial copy $p_{i_x}$ in the reference pictures, and relative scaling of the motion vector determines the shift within the reference picture for determining $p_{i_x+1}$, $p_{i_x+2}$, etc.

Figure 5:
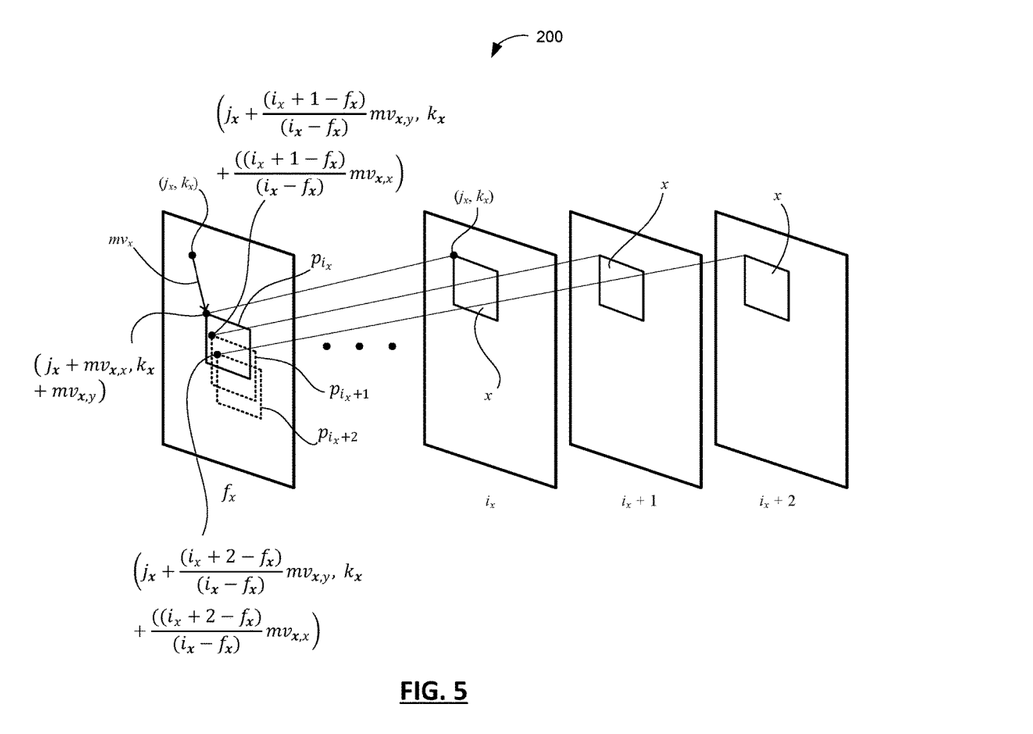
FIG. 5 shows an example of 2D to 3D mapping inter-prediction for an example coding cuboid.

To illustrate, reference is now made to FIG. 5, which diagrammatically shows a sequence 200 of pictures in a video that uses the 2D to 3D Mapping Model for inter prediction. A single motion vector and a single reference picture index are used to generate prediction p for x in this case. Specifically, let $mv_x=(mv_{x,x}, mv_{x,y})$ denote the motion vector for x, and let $f_x$ denote the index of the reference picture for x. Then the predicted image $p_l$ for $l=i_x$ is the image block at $(j_x+mv_{x,x}, k_x+mv_{x,y})$ in picture $f_x$. The predicted images for other slices of the coding block, i.e. for $l=i_x+1, \ldots, i_x+N_{x,t}-1$, are image blocks from the picture $f_x$ that are slightly shifted from $(j_x+mv_{x,x}, k_x+mv_{x,y})$. The location of those image blocks for $p_l$ may be expressed as $(j_x+a_l \cdot mv_{x,x}, k_x+b_l \cdot mv_{x,y})$, where $a_l$ and $b_l$ are scaling factors that vary depending on the index of the predicted image $p_l$ being created. In many embodiments, the scaling factors depend on the relative distance between $i_x$ and $l$. For example, if one were to presume that the reference picture $f_x$ is located immediately prior to the first picture in x, i.e. if $f_x=i_x-1$, then the scaling factors may be expressed as multipliers based on l, such that the coordinates of the $p_l$ image blocks are located at $(j_x+(l-i_x+1)mv_{x,y}, k_x+(l-i_x+1)mv_{x,x})$.

In many embodiments, and as illustrated in FIG. 5, the scaling factors may further take into account the distance between the reference picture $f_x$ and the first picture of x and the image block in x being predicted, i.e. the distance is the difference between their respective indices or, equivalently, the difference between their respective positions in the coding order. In such an embodiment, as one example the location of the $p_l$ image blocks may be expressed as:

$$\left( j_x + \frac{(l-f_x)}{(i_x-f_x)} mv_{x,y}, k_x + \frac{(l-f_x)}{(i_x-f_x)} mv_{x,x} \right)$$

The above expression reflects scaling factors that may be conceptually understood as a linear projection of the motion vector, where the motion vector specifies the translation from the first image of the coding cuboid to the reference picture.

In comparison to the 2D translation model where $N_{x,t}$ motion vectors need to be coded, a single motion vector $mv_x$ and a single reference picture index $f_x$ are to be coded in the 2D to 3D Mapping Model. Consequently, the cost of coding motion vectors and reference picture indices in the 2D to 3D Mapping Model is typically lower than that in the 2D Translation Model.

Note that the above inter-prediction processes can be extended to cases where p is a linear combination of two or more prediction cuboids, e.g. as in bi-direction (inter) prediction. In those cases, each of these cuboids may be generated by using the motion compensation process described above; and p is derived from these cuboids by using weighting coefficients known a priori or coded and transmitted to the decoder.

It will further be appreciated that, in generating prediction for a cuboid, it is possible to use fractional temporal indices, in addition to fractional spatial positions. In other words, some embodiments may interpolate a picture between two reconstructed pictures and use it as a reference picture. Since the reconstructed pictures may be regarded as reference pictures at integer indices, the interpolated reference picture may be referred to as a reference picture at fractional indices.

It will also be understood that the concept of rolling prediction may be applied to generate prediction p in the 2D to 3D Mapping Model, where rolling prediction refers to a process where a predicted pixel may be used to generate prediction for a next pixel. At least one example of rolling prediction is described in U.S. patent application Ser. No. 15/016,887, filed Feb. 5, 2016, the contents of which are hereby incorporated by reference.

Finally, it will be appreciated that motion vectors used for luma components may be scaled before being used for chroma components, where the scaling factor is dependent upon the chroma subsampling mode. For example, no scaling is needed in 4:4:4 chroma subsampling, and a factor of ½ is used in 4:2:0 subsampling. In 4:2:2 chroma subsampling, the vertical components of motion vectors are not scaled but the horizontal components of motion vectors are scaled by a factor of ½.

3D Transform and Quantization

Consider a current LCC at (j, k, i) with dimensions $N_x \times N_y \times N_t$. Let x denote a rectangular cuboid in the current LCC, and let e=x−p denote the residuals after the prediction process, where p denotes the prediction for x. Note that x is not necessarily of the same size as the current LCC, and once obtained, e may be further partitioned into smaller transform units or combined with other residual blocks to form a larger transform unit for transform and quantizaton. For example, we may use 8×8×4 prediction units to partition a coding cuboid to generate predictions, and may use 4×4×2, 8×8×4, 16×16×2, or 16×16×4 partitioning to transform and quantize e.

To facilitate quantization, x may be transformed by using a 3D transform, e.g., a 3D DCT, a 3D wavelet, a 3D DST (Discrete Sine Transform), a 3D KLT (Karhunen-Loève transform), a 3D identity transform, or their integer approximations. In particular, using the example of a 3D DCT, suppose that x is at $(j_x, k_x, i_x)$ and with dimensions $N_{x,x} \times N_{x,y} \times N_{x,t}$, where $1 \leq N_{x,x} \leq N_x$, $1 \leq N_{x,y} \leq N_y$, and $1 \leq N_{x,t} \leq N_t$. Let $e_l$ denote the residual block corresponding to $x_l$, the intersection between picture l and x, $l=i_x, i_x+1, \ldots, i_x+N_{x,t}-1$.

In example process, the following operations are carried out for transforming a 3D cuboid:

(1) For $l=i_x, i_x+1, \ldots, i_x+N_{x,t}-1$, transform $e_l$ by using a 2D DCT. Denote the DCT output by $y_{l-i_x}$.

(2) For each (h, v) such that $j_x \leq h \leq j_x + N_{x,y}-1$ and $k_x \leq v \leq k_x + N_{x,x}-1$, transform $[y_{v,h,0}, y_{v,h,1}, \ldots, y_{v,h,N_{x,t}-1}]$ by using a 1D DCT and obtain a sequence $[z_{h-j_x,v-k_x,0}, z_{h-j_x,v-k_x,1}, \ldots z_{h-j_x,v-k_x,N_{x,t}-1}]$.

The cuboid $[z_{v,h,i}; 0 \leq h \leq N_{x,x}-1, 0 \leq v \leq N_{x,y}-1, 0 \leq l \leq N_{x,t}-1]$ is the 3D DCT output in response to the residuals e, where $z_{0,0,0}$ is sometimes called the DC component of e.

Similar to the quantizer design in HEVC, a quantization parameter Qp may be associated with the current LCC in our solution, from which a quantization step size or a quantization matrix may be derived for e, and applied to its 3D transform output, z. Let u denote the quantization output in response to z. Since DCT concentrates energy around the DC component, the energy of e will be concentrated in $z_l$ where l is close to 0, especially if there exists temporal redundancy in e. Consequently, we see that $u_l$ will likely be populated with 0's for large l, leading to savings in rate. Furthermore, energy preserved in $u_l$ where l is close to 0 allows for smooth transitions between pictures at co-located positions. As such, while exploiting temporal redundancy for rate savings, the present solution avoids quality fluctuations in neighboring pictures as seen in existing solutions that use temporal layers.

Example Methods

Figure 6:
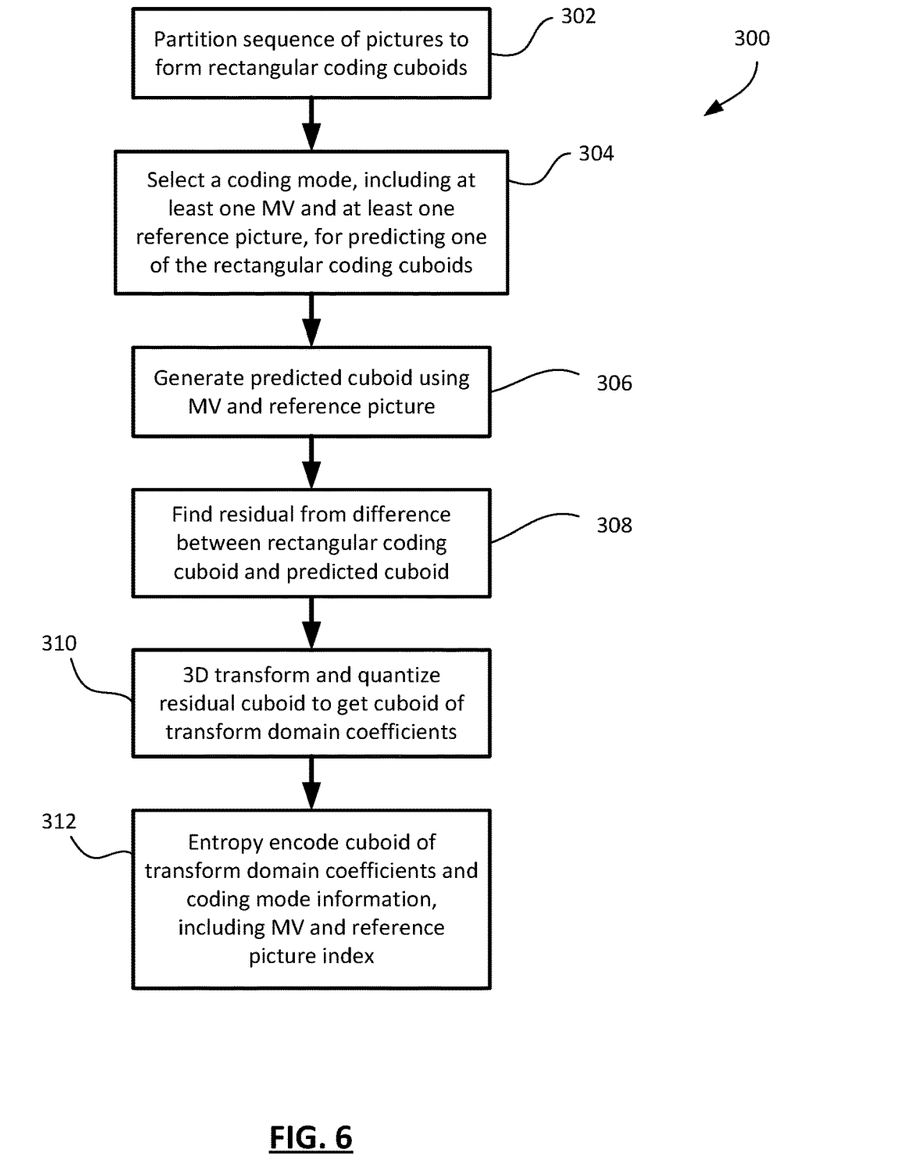
FIG. 6 shows, in flowchart form, one example process for encoding a video using 3D inter-prediction and 3D transforms.

Reference is now made to FIG. 6, which shows, in flowchart form, one example process 300 to encode a video using 3D prediction and transform. The video includes a sequence of pictures in a coding order. As indicated by operation 302, the sequence of pictures is partitioned to create a plurality of rectangular coding cuboids. It was noted above that the partitioning process may involve first partitioning the sequence of pictures into largest coding cuboids, LCCs, and then partitioning each LCC into coding cuboids. Irrespective of whether there is one partitioning or multiple layers of partitioning, the sequence of pictures is broken down into rectangular coding cuboids, each of which intersects at least two consecutive pictures in the sequence of pictures.

In operation 304, a coding mode is selected for at least one of the rectangular coding cuboids. The coding mode may include further partitioning into prediction units in some cases. The coding mode in this example is an inter-prediction mode using motion compensation to build a predicted cuboid. The coding mode thus includes at least one motion vector and at least one reference picture. As noted above, there are various implementations of motion compensation that may be used in different embodiments including 2D Translation, 3D Translation, and 2D to 3D Mapping. In the case of 3D Translation and 2D to 3D Mapping, there may be one motion vector and one reference picture per prediction cuboid. It will be appreciated that the encoder may engage in a rate-distortion optimized search for the motion vector(s) and reference picture(s) in order to select a quasi-optimal coding mode. A rate-distortion optimized search may also be used to select between using 2D Translation, 3D Translation and/or 2D to 3D Mapping as the model for inter-prediction in coding the rectangular coding cuboid. The decision as to which model applies in a given case may be communicated to the decoder using one or more flags in a header portion of the bitstream, for example at any one of a group-of-pictures, picture, coding unit, or prediction unit level.

The predicted cuboid is generated in operation 306 using the selected coding mode, including the motion vector(s) and reference picture(s). In operation 308, a residual cuboid is determined by subtracting the predicted cuboid from the original rectangular coding cuboid (or portion thereof, if the predicted cuboid corresponds to a prediction unit smaller than the full rectangular coding cuboid). It will be appreciated that the subtraction is on a pixel-by-pixel basis. The resulting cuboid of residuals may be termed an error cuboid, in some cases.

In operation 310, the residual cuboid is transformed and quantized. The transform applied is a 3D transform, such as a 3D DCT or a similar spectral transform. The quantization may be applied in accordance with a selected Qp value, which may be determined as a part of determining the coding mode in operation 304. The Qp value may be set for a picture, group-of-pictures, slice, cuboid, prediction unit, or transform unit, in various implementations. In some cases, the quantization operation in practice is built into the transform operation as a unified mathematical operation on the residual cuboid. The transform and quantization produces a cuboid of transform domain coefficients.

The cuboid of transform domain coefficients is entropy encoded in operation 312. The entropy encoding of the coefficients may be carried out using various entropy encoding methods, including arithmetic coding, and various possible scan orders and syntax elements for converting the three dimensional coefficient cuboid into a one dimensional series of syntax elements to be encoded in the bitstream. In addition to the coefficients, coding mode information is encoded in the bitstream. For example, the coding mode information may include the prediction mode selected, such as inter-coding versus intra-coding, partition modes(s), the corresponding motion vector(s), reference picture index(es) and other side information.

Figure 7:
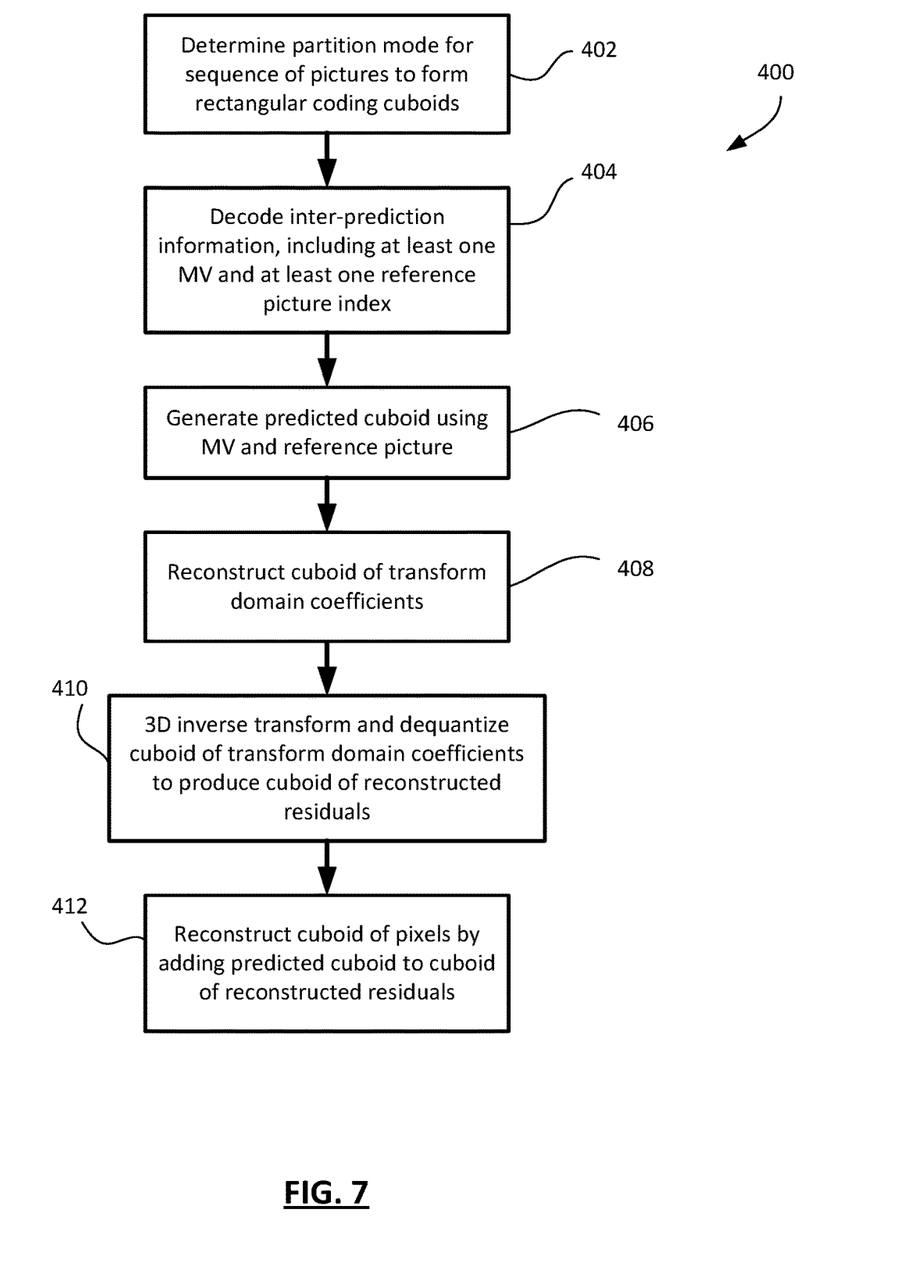
FIG. 7 shows, in flowchart form, one example process for decoding a video using 3D inter-prediction and 3D transforms.

A corresponding example process 400 for decoding a bitstream of data to reconstruct a video is shown in flowchart form in FIG. 7.

In operation 402, the decoder determines a partition mode for a sequence of pictures. As noted above, a sequence of pictures may be first partitioned into LCCs and then each LCC may be further partitioned into rectangular coding cuboids, in some example implementations. In some examples, the sequence of pictures may be directly partitioned into coding cuboids. The partitioning to be applied may be predetermined based on a video type or format. The partitioning may be signaled to the decoder in the bitstream. For example, a header associated with a group of pictures, picture, slice, etc., may signal the partitioning to be applied. The partitioning results in the division of a sequence of pictures into coding cuboids.

The decoder then proceeds to decoder the coding cuboids in accordance with a prescribed order. In operation 404 the decoder decodes inter-prediction information, e.g. coding mode information, applicable to one of the coding cuboids. The inter-prediction information includes at least one motion vector and at least one reference picture index. As noted above, the bitstream may include a flag or other indicator specifying the type of inter-prediction (2D Translation, 3D Translation, 2D to 3D Mapping, etc.) if multiple models of inter-prediction may be used.

Using the decoded inter-prediction information, the decoder the builds a predicted cuboid in operation 406. As described above, the predicted cuboid may be built as a series of predicted blocks (2D Translation), as a copy of a 3D cuboid from a series of reference pictures (3D Translation), or as a progressive series of copies of blocks mapped to the predicted cuboid from a single reference picture (2D to 3D Mapping), as examples.

In operation 408, the decoder entropy decodes transform coefficient data from the bitstream to a cuboid of quantized transform domain coefficients. It then, in operation 410, dequantizes and inverse transforms the decoded cuboid of quantized transform domain coefficients to create a cuboid of reconstructed residuals. In some examples, the cuboid of reconstructed residuals is the same size as the predicted cuboid. In some examples is smaller and multiple neighbouring cuboids of reconstructed residuals are reconstructed in operations 408 and 410 to match the size of the predicted cuboid.

The decoder reconstructs the cuboid of pixels by summing the predicted cuboid with the cuboid of reconstructed residuals, as indicated by operation 412.

Those having ordinary skill in the art will appreciate that various operations in the described processes may be performed in a different order, or simultaneously, or in parallel, in some embodiments without affecting the overall functioning of the process.

Although the above examples focus upon inter-prediction in combination with three-dimensional transforms, it will be appreciated that in some cases three-dimensional transforms may be used in connection with intra-prediction. The intra-prediction may be done block-by-block to build up temporally consecutive predicted blocks that are then aggregated to form a predicted cuboid, for example. In another example, the intra-prediction may be three-dimensional in that a single intra-prediction mode/direction is specified for a prediction cuboid and that direction is used to build a three-dimensional predicted cuboid.

Figure 8:
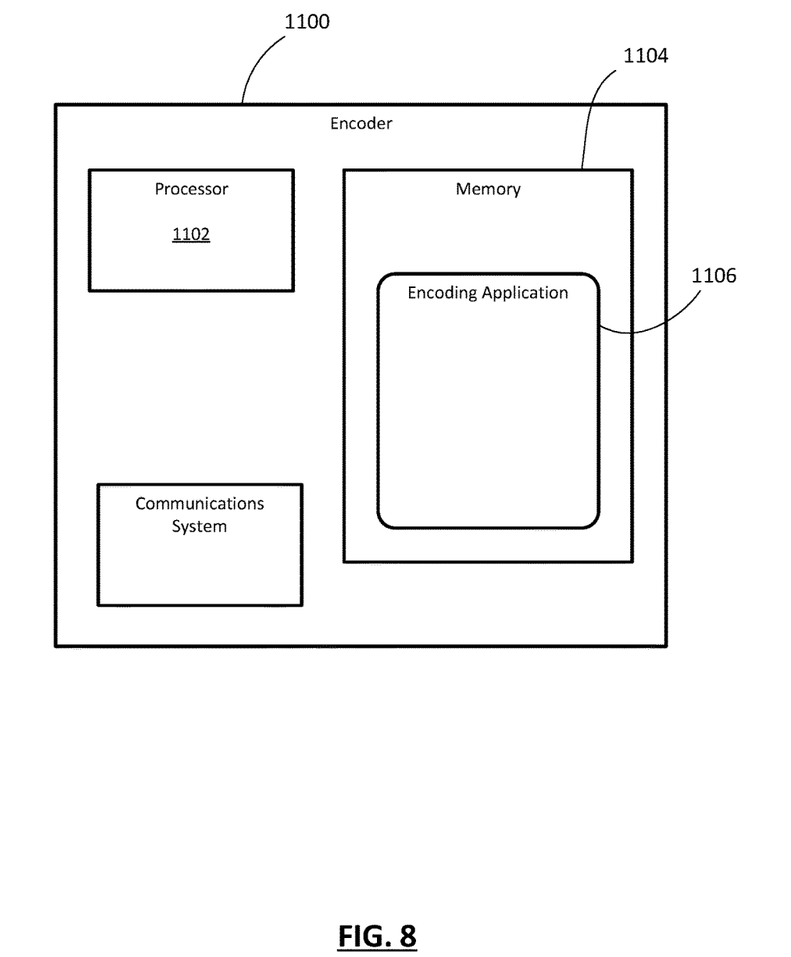
FIG. 8 shows a simplified block diagram of an example embodiment of an encoder.

Reference is now made to FIG. 8, which shows a simplified block diagram of an example embodiment of an encoder 1100. The encoder 1100 includes a processor 1102, memory 1104, and an encoding application 1106. The encoding application 1106 may include a computer program or application stored in memory 1104 and containing instructions that, when executed, cause the processor 1102 to perform operations such as those described herein. For example, the encoding application 1106 may encode and output bitstreams encoded in accordance with the processes described herein. It will be understood that the encoding application 1106 may be stored in on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 9:
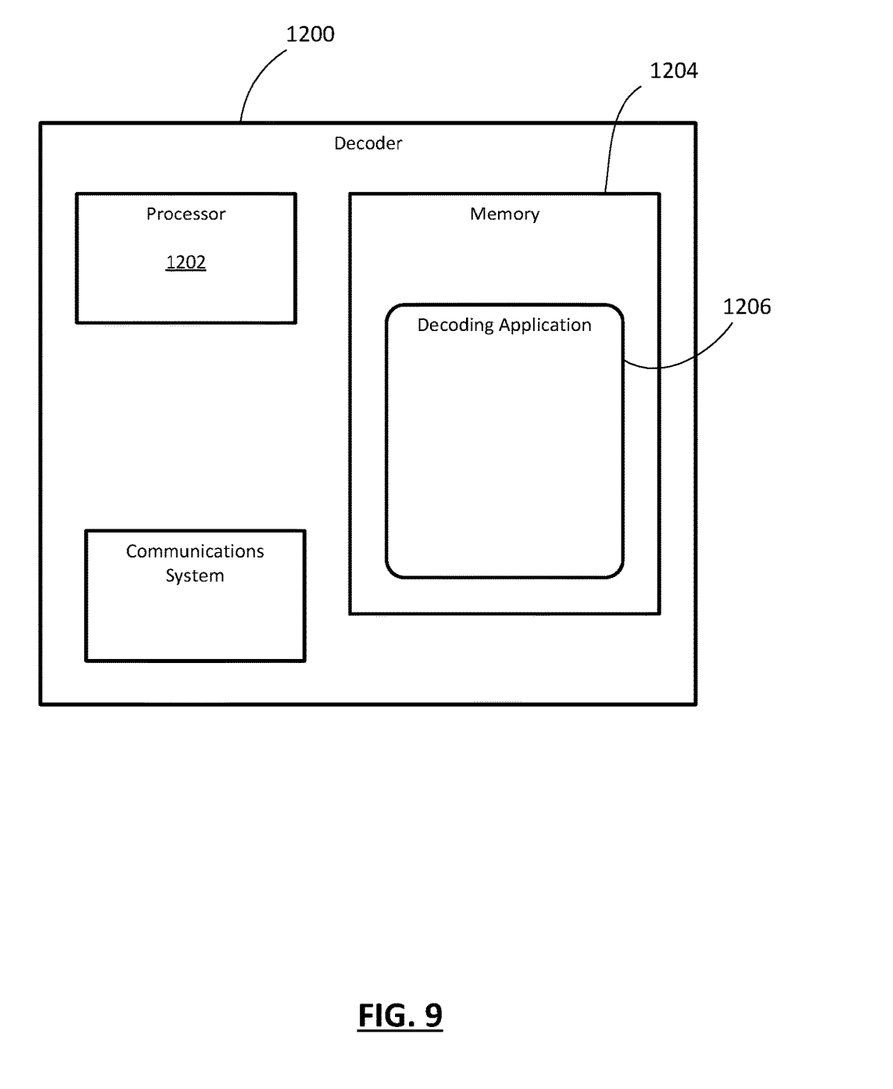
FIG. 9 shows a simplified block diagram of an example embodiment of a decoder.

Reference is now also made to FIG. 9, which shows a simplified block diagram of an example embodiment of a decoder 1200. The decoder 1200 includes a processor 1202, a memory 1204, and a decoding application 1206. The decoding application 1206 may include a computer program or application stored in memory 1204 and containing instructions that, when executed, cause the processor 1202 to perform operations such as those described herein. It will be understood that the decoding application 1206 may be stored in on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a video from a bitstream, the video including a sequence of pictures in a coding order, the method comprising:
   decoding a partition mode from the bitstream, the partition mode defining the partitioning of a portion of the sequence of pictures into a plurality of rectangular coding cuboids, at least one rectangular coding cuboid including portions of two or more consecutive pictures in the coding order;
   decoding, from the bitstream, inter-prediction information associated with the at least one rectangular coding cuboid, including at least one motion vector and at least one reference picture index;
   generating a predicted cuboid for said at least one rectangular coding cuboid based on the at least one motion vector and the at least one reference picture index;
   reconstructing a cuboid of transform domain coefficients from the bitstream;
   dequantizing and three-dimensional inverse transforming the cuboid of transform domain coefficients to produce a reconstructed residual cuboid; and
   reconstructing the pixels of said at least one rectangular coding cuboid as the sum of the predicted cuboid and the reconstructed residual cuboid,
   whereby the three-dimensional inverse transforming improves data compression through exploiting temporal redundancy remaining in the reconstructed residual cuboid despite the use of inter-prediction.

2. The method claimed in claim 1, wherein the at least one motion vector comprises a single motion vector, the at least one reference picture index comprises a single reference picture index, and wherein generating the predicted cuboid includes copying a reference cuboid of pixel values specified by the single motion vector and the single reference picture index, wherein the reference cuboid includes portions of at least two previously-reconstructed consecutive pictures in the coding order.

3. The method claimed in claim 1, wherein the at least one motion vector comprises a single motion vector, the at least one reference picture index comprises a single reference picture index, and wherein generating the predicted cuboid comprises, for each portion of the two or more consecutive pictures,
   copying a block of pixel values in a single reference picture specified by the single reference picture index, wherein block of pixels for each portion of the two or more consecutive pictures is specified by a weighted motion vector, wherein the weighted motion vector comprises the single motion vector multiplied by a weighting factor.

4. The method claimed in claim 3, wherein the weighting factor is based on the difference in position in the coding order between the portion of the two or more consecutive pictures being predicted and the single reference picture.

5. The method claimed in claim 4, wherein the weighting factor is further based on the distance between a first of the two or more consecutive pictures and the single reference picture.

6. The method claimed in claim 1, wherein the at least one motion vector includes a respective motion vector associated with each portion, and wherein generating the predicted cuboid comprises, for each portion of the two or more consecutive pictures, copying a block of pixel values in a respective reconstructed picture specified by the respective motion vector associated with that portion.

7. The method claimed in claim 1, wherein three-dimensional inverse transforming the cuboid of transform domain coefficients comprises applying a one-dimensional inverse transform to a series of coefficients having the same row and column index in consecutive blocks of the cuboid of transform domain coefficients to produce a partially inverse transformed cuboid, and then applying a two-dimensional inverse transform to the partially inverse transformed cuboid to produce the reconstructed residual cuboid.

8. A decoder for decoding a video from a bitstream, the video including a sequence of pictures in a coding order, the decoder comprising:
   a processor;
   memory; and
   a decoding application containing instructions executable by the processor that, when executed, cause the processor to
   decode a partition mode from the bitstream, the partition mode defining the partitioning of a portion of the sequence of pictures into a plurality of rectangular coding cuboids, at least one rectangular coding cuboid including two or more consecutive pictures in the coding order;
   decode, from the bitstream, inter-prediction information associated with the at least one rectangular coding cuboid, including at least one motion vector and at least one reference picture index;
   generate a predicted cuboid for said at least one rectangular coding cuboid based on the at least one motion vector and the at least one reference picture index;
   reconstruct a cuboid of transform domain coefficients from the bitstream;
   dequantize and three-dimensional inverse transforming the cuboid of transform domain coefficients to produce a reconstructed residual cuboid; and
   reconstruct the pixels of said at least one rectangular coding cuboid as the sum of the predicted cuboid and the reconstructed residual cuboid,
   whereby the three-dimensional inverse transforming improves data compression through exploiting temporal redundancy remaining in the reconstructed residual cuboid despite the use of inter-prediction.

9. The decoder claimed in claim 8, wherein the at least one motion vector comprises a single motion vector, the at least one reference picture index comprises a single reference picture index, and wherein the instructions, when executed, cause the processor to generate the predicted cuboid by copying a reference cuboid of pixel values specified by the single motion vector and the single reference picture index, wherein the reference cuboid includes portions of at least two previously-reconstructed consecutive pictures in the coding order.

10. The decoder claimed in claim 8, wherein the at least one motion vector comprises a single motion vector, the at least one reference picture index comprises a single reference picture index, and wherein the instructions, when executed, cause the processor to generate the predicted cuboid by, for each portion of the two or more consecutive pictures, copying a block of pixel values in a single reference picture specified by the single reference picture index, wherein block of pixels for each portion of the two or more consecutive pictures is specified by a weighted motion vector, wherein the weighted motion vector comprises the single motion vector multiplied by a weighting factor.

11. The decoder claimed in claim 10, wherein the weighting factor is based on the difference in position in the coding order between the portion of the two or more consecutive pictures being predicted and the single reference picture.

12. The decoder claimed in claim 11, wherein the weighting factor is further based on the distance between a first of the two or more consecutive pictures and the single reference picture.

13. The decoder claimed in claim 8, wherein the at least one motion vector includes a respective motion vector associated with each portion, and wherein the instructions, when executed, cause the processor to generate the predicted cuboid by, for each portion of the two or more consecutive pictures, copying a block of pixel values in a respective reconstructed picture specified by the respective motion vector associated with that portion.

14. The decoder claimed in claim 8, and wherein the instructions, when executed, cause the processor to three-dimensional inverse transform the cuboid of transform domain coefficients by applying a one-dimensional inverse transform to a series of coefficients having the same row and column index in consecutive blocks of the cuboid of transform domain coefficients to produce a partially inverse transformed cuboid, and then applying a two-dimensional inverse transform to the partially inverse transformed cuboid to produce the reconstructed residual cuboid.

15. A non-transitory processor-readable medium storing processor-executable instructions for decoding a video from a bitstream, the video including a sequence of pictures in a coding order, wherein the processor-executable instructions, when executed by a processor in the video or image decoder, cause the processor to:
　decode a partition mode from the bitstream, the partition mode defining the partitioning of a portion of the sequence of pictures into a plurality of rectangular coding cuboids, at least one rectangular coding cuboid including two or more consecutive pictures in the coding order;
　decode, from the bitstream, inter-prediction information associated with the at least one rectangular coding cuboid, including at least one motion vector and at least one reference picture index;
　generate a predicted cuboid for said at least one rectangular coding cuboid based on the at least one motion vector and the at least one reference picture index;
　reconstruct a cuboid of transform domain coefficients from the bitstream;
　dequantize and three-dimensional inverse transforming the cuboid of transform domain coefficients to produce a reconstructed residual cuboid; and
　reconstruct the pixels of said at least one rectangular coding cuboid as the sum of the predicted cuboid and the reconstructed residual cuboid,
　whereby the three-dimensional inverse transforming improves data compression through exploiting temporal redundancy remaining in the reconstructed residual cuboid despite the use of inter-prediction.

16. A method of encoding a video in a video encoder to produce a bitstream, the video including a sequence of pictures in a coding order, the sequence of pictures being partitioned into a plurality of rectangular coding cuboids, at least one rectangular coding cuboid including portions of two or more consecutive pictures in the coding order, the method comprising:
　selecting inter-prediction information for the at least one rectangular coding cuboid, including at least one motion vector and at least one reference picture index;
　generating a predicted cuboid for said at least one rectangular coding cuboid based on the at least one motion vector and the at least one reference picture index;
　determining a cuboid of residuals by subtracting the predicted cuboid from said at least one rectangular coding cuboid;
　three-dimensional spectral transforming and quantizing the cuboid of residuals to generate a cuboid of transform domain coefficients; and
　entropy encoding the cuboid of transform domain coefficients and the inter-prediction information,
　whereby the three-dimensional spectral transforming improves data compression through exploiting temporal redundancy remaining in the cuboid of residuals despite the use of inter-prediction.

17. The method claimed in claim 16, wherein the at least one motion vector comprises a single motion vector, the at least one reference picture index comprises a single reference picture index, and wherein generating the predicted cuboid includes copying a reference cuboid of pixel values specified by the single motion vector and the single reference picture index, wherein the reference cuboid includes portions of at least two previously-reconstructed consecutive pictures in the coding order.

18. The method claimed in claim 16, wherein the at least one motion vector comprises a single motion vector, the at least one reference picture index comprises a single reference picture index, and wherein generating the predicted cuboid comprises, for each portion of the two or more consecutive pictures,
　copying a block of pixel values in a single reference picture specified by the single reference picture index, wherein block of pixels for each portion of the two or more consecutive pictures is specified by a weighted motion vector, wherein the weighted motion vector comprises the single motion vector multiplied by a weighting factor.

19. The method claimed in claim 18, wherein the weighting factor is based on the difference in position in the coding order between the portion of the two or more consecutive pictures being predicted and the single reference picture.

20. The method claimed in claim 19, wherein the weighting factor is further based on the distance between a first of the two or more consecutive pictures and the single reference picture.

21. The method claimed in claim 16, wherein the at least one motion vector includes a respective motion vector associated with each portion, and wherein generating the predicted cuboid comprises, for each portion of the two or more consecutive pictures, copying a block of pixel values in a respective reconstructed picture specified by the respective motion vector associated with that portion.

22. The method claimed in claim 16, wherein the cuboid of residuals includes a series of blocks of residuals corresponding to the portions of two or more consecutive pictures, and wherein three-dimensional spectral transforming the cuboid of residuals comprises applying a two-dimensional inverse transform to each of the blocks in the series to produce a two-dimensional transformed cuboid of coefficients, and then applying a one-dimensional transform to a sequence of coefficients having the same row and column index in the series of blocks to produce the cuboid of transform domain coefficients.

23. An encoder for encoding a video to produce a bitstream of encoded data, the video including a sequence of pictures in a coding order, the sequence of pictures being partitioned into a plurality of rectangular coding cuboids, at least one rectangular coding cuboid including portions of two or more consecutive pictures in the coding order, the encoder comprising:
  a processor;
  memory; and
  an encoding application containing instructions executable by the processor that, when executed, cause the processor to
    select inter-prediction information for the at least one rectangular coding cuboid, including at least one motion vector and at least one reference picture index;
    generate a predicted cuboid for said at least one rectangular coding cuboid based on the at least one motion vector and the at least one reference picture index;
    determine a cuboid of residuals by subtracting the predicted cuboid from said at least one rectangular coding cuboid;
    three-dimensional spectral transform and quantize the cuboid of residuals to generate a cuboid of transform domain coefficients; and
    entropy encode the cuboid of transform domain coefficients and the inter-prediction information,
    whereby the three-dimensional spectral transforming improves data compression through exploiting temporal redundancy remaining in the cuboid of residuals despite the use of inter-prediction.

24. A non-transitory processor-readable medium storing processor-executable instructions for encoding an image in a video or image encoder to produce a bitstream, the video including a sequence of pictures in a coding order, the sequence of pictures being partitioned into a plurality of rectangular coding cuboids, at least one rectangular coding cuboid including portions of two or more consecutive pictures in the coding order, wherein the processor-executable instructions, when executed by a processor in the video or image encoder, cause the processor to:
  select inter-prediction information for the at least one rectangular coding cuboid, including at least one motion vector and at least one reference picture index;
  generate a predicted cuboid for said at least one rectangular coding cuboid based on the at least one motion vector and the at least one reference picture index;
  determine a cuboid of residuals by subtracting the predicted cuboid from said at least one rectangular coding cuboid;
  three-dimensional spectral transform and quantize the cuboid of residuals to generate a cuboid of transform domain coefficients; and
  entropy encode the cuboid of transform domain coefficients and the inter-prediction information,
  whereby the three-dimensional spectral transforming improves data compression through exploiting temporal redundancy remaining in the cuboid of residuals despite the use of inter-prediction.

* * * * *